(12) United States Patent
Gatenby et al.

(10) Patent No.: US 11,933,553 B2
(45) Date of Patent: Mar. 19, 2024

(54) ALUMINUM ALLOY FOR HEAT EXCHANGER FINS

(71) Applicants: NOVELIS INC., Atlanta, GA (US); Denso Corporation, Aichi (JP)

(72) Inventors: Kevin Michael Gatenby, Johns Creek, GA (US); Hany Ahmed, Atlanta, GA (US); Andrew D. Howells, Kingston (CA); Jyothi Kadali, Atlanta, GA (US); Derek Aluia, Novi, MI (US); John Michael Baciak, III, Royal Oak, MI (US)

(73) Assignees: NOVELIS INC., Atlanta, GA (US); DENSO CORPORATION, Aichi (JP)

( * ) Notice: Subject to any disclaimer, the term of this patent is extended or adjusted under 35 U.S.C. 154(b) by 0 days.

(21) Appl. No.: 17/656,793

(22) Filed: Mar. 28, 2022

(65) Prior Publication Data
US 2022/0221236 A1 Jul. 14, 2022

Related U.S. Application Data

(62) Division of application No. 14/816,280, filed on Aug. 3, 2015, now abandoned.

(60) Provisional application No. 62/033,879, filed on Aug. 6, 2014.

(51) Int. Cl.

| | | |
|---|---|---|
| C22F 1/04 | (2006.01) |
| B22D 21/04 | (2006.01) |
| B23K 1/00 | (2006.01) |
| C22C 21/00 | (2006.01) |
| C22C 21/02 | (2006.01) |
| C22C 21/10 | (2006.01) |
| C22F 1/043 | (2006.01) |
| C22F 1/053 | (2006.01) |
| F28F 21/08 | (2006.01) |

(52) U.S. Cl.
CPC ............ *F28F 21/084* (2013.01); *B22D 21/04* (2013.01); *B23K 1/0012* (2013.01); *C22C 21/00* (2013.01); *C22C 21/02* (2013.01); *C22C 21/10* (2013.01); *C22F 1/04* (2013.01); *C22F 1/043* (2013.01); *C22F 1/053* (2013.01)

(58) Field of Classification Search
None
See application file for complete search history.

(56) References Cited

U.S. PATENT DOCUMENTS

| | | |
|---|---|---|
| 4,571,368 A | 2/1986 | Fenoglio et al. |
| 5,079,087 A | 1/1992 | Lever et al. |
| 5,217,547 A | 6/1993 | Ishikawa et al. |
| 5,616,189 A | 4/1997 | Jin et al. |
| 5,857,266 A | 1/1999 | Raybould et al. |
| 6,153,025 A | 11/2000 | Auran et al. |
| 6,165,291 A | 12/2000 | Jin et al. |
| 6,238,497 B1 | 5/2001 | Jin et al. |
| 6,408,938 B2 | 6/2002 | Gray et al. |
| 6,592,688 B2 | 7/2003 | Jin et al. |
| 6,610,247 B2 | 8/2003 | Wittebrood et al. |
| 6,620,265 B2 | 9/2003 | Kawahara et al. |
| 6,644,388 B1 | 11/2003 | Kilmer et al. |
| 6,800,244 B2 | 10/2004 | Wittebrood et al. |
| 6,925,711 B2 | 8/2005 | Kilmer et al. |
| 6,959,853 B2 | 11/2005 | Graham et al. |
| 7,000,823 B2 | 2/2006 | Dockus et al. |
| 7,018,722 B2 | 3/2006 | Toyama et al. |
| 7,172,664 B2 | 2/2007 | Davisson et al. |
| 9,964,364 B2 | 5/2018 | Ren |
| 2001/0001402 A1 | 5/2001 | Jin et al. |
| 2001/0028960 A1 | 10/2001 | Gray et al. |
| 2002/0001727 A1 | 1/2002 | Robbins |
| 2002/0007881 A1 | 1/2002 | Daaland et al. |
| 2002/0173614 A1 | 11/2002 | Robbins |
| 2003/0086812 A1 | 5/2003 | Wittebrood et al. |

(Continued)

FOREIGN PATENT DOCUMENTS

| | | |
|---|---|---|
| CA | 2391381 | 5/2001 |
| CA | 2553910 | 8/2005 |

(Continued)

OTHER PUBLICATIONS

Lienert, T. ASM Handbook, vol. 6A, Welding Fundamentals and Processes, "Glossary of Terms", pp. 882-891. (Year: 2011).*
U.S. Appl. No. 14/816,280, Advisory Action, dated Jan. 15, 2021, 3 pages.
U.S. Appl. No. 14/816,280, Advisory Action, dated Mar. 11, 2022, 5 pages.
U.S. Appl. No. 14/816,280, Advisory Action, dated Sep. 20, 2018, 5 pages.
U.S. Appl. No. 14/816,280, Final Office Action, dated Aug. 25, 2020, 11 pages.

(Continued)

*Primary Examiner* — George Wyszomierski
*Assistant Examiner* — Janell C Morillo
(74) *Attorney, Agent, or Firm* — Kilpatrick Townsend & Stockton LLP

(57) ABSTRACT

An aluminum alloy fin stock material comprising about 0.9-1.2 wt. % Si, 0.3-0.5 wt. % Fe, 0.20-0.40 wt. % Cu, 1.0-1.5 wt. % Mn, 0-0.1% Mg and 0.0-3.0% Zn, with remainder Al and impurities at ≤0.15 wt. %. The aluminum alloy fin stock material is produced in a form of a sheet by a process comprising the steps of direct chill casting an ingot, hot rolling the ingot after the direct chill casting, cold rolling the aluminum alloy to an intermediate thickness, inter-annealing the aluminum alloy cold rolled to an intermediate thickness at a temperature between 200 and 400° C., and cold rolling the material after inter-annealing to achieve % cold work (% CW) of 20 to 40%. The aluminum alloy fin stock material possesses an improved combination of one or more of pre- and/or post-brazes strength, conductivity, sag resistance and corrosion potential. It is useful for fabrication of heat exchanger fins.

10 Claims, No Drawings

(56) References Cited

U.S. PATENT DOCUMENTS

| | | | |
|---|---|---|---|
| 2003/0102060 A1 | 6/2003 | Daaland et al. |
| 2004/0028940 A1 | 2/2004 | Toyama et al. |
| 2004/0068871 A1 | 4/2004 | Kilmer et al. |
| 2004/0086417 A1 | 5/2004 | Baumann et al. |
| 2004/0118492 A1 | 6/2004 | Stenqvist |
| 2004/0182482 A1 | 9/2004 | Gray et al. |
| 2005/0019204 A1 | 1/2005 | Haller et al. |
| 2005/0019205 A1 | 1/2005 | Davisson et al. |
| 2005/0106410 A1 | 5/2005 | Jiang et al. |
| 2005/0150642 A1 | 7/2005 | Baumann |
| 2005/0211345 A1 | 9/2005 | Baumann et al. |
| 2007/0113936 A1 | 5/2007 | Oki et al. |
| 2007/0286763 A1 | 12/2007 | Sicking et al. |
| 2008/0118393 A1 | 5/2008 | Oskarsson et al. |
| 2009/0308500 A1 | 12/2009 | Suzuki et al. |
| 2010/0012229 A1 | 1/2010 | Oskarsson et al. |
| 2011/0076184 A1 | 3/2011 | Zhang et al. |
| 2012/0129003 A1 | 5/2012 | Ando et al. |
| 2014/0360712 A1 | 12/2014 | Fujita et al. |

FOREIGN PATENT DOCUMENTS

| | | | | |
|---|---|---|---|---|
| CA | 2607784 | | 4/2008 | |
| CN | 1491289 | | 4/2004 | |
| CN | 1914340 | | 2/2007 | |
| CN | 1918310 | | 2/2007 | |
| CN | 1938439 | | 3/2007 | |
| CN | 101220430 | | 7/2008 | |
| CN | 101230431 | | 7/2008 | |
| EP | 0091231 | | 10/1983 | |
| EP | 1242643 | | 9/2002 | |
| EP | 1300480 | | 4/2003 | |
| EP | 1435390 | | 7/2004 | |
| EP | 1693475 | | 8/2006 | |
| EP | 1693475 | | 9/2006 | |
| EP | 1717327 | | 11/2006 | |
| EP | 1753885 | | 2/2007 | |
| EP | 1918394 | | 5/2008 | |
| EP | 2048252 | | 4/2009 | |
| EP | 2551364 | | 1/2013 | |
| GB | 2390099 | | 12/2003 | |
| JP | 55140098 | | 11/1980 | |
| JP | 62196348 | | 8/1987 | |
| JP | 01195263 | | 8/1989 | |
| JP | 03047940 | | 2/1991 | |
| JP | 05247570 | | 9/1993 | |
| JP | 0770685 | | 3/1995 | |
| JP | 07070685 | | 3/1995 | |
| JP | 08143998 | | 6/1996 | |
| JP | 10081932 | | 3/1998 | |
| JP | 1088265 | | 4/1998 | |
| JP | 10088265 | | 4/1998 | |
| JP | 2000169926 | | 6/2000 | |
| JP | 2002161323 | | 6/2002 | |
| JP | 2002161324 | | 6/2002 | |
| JP | 2002161324 A | * | 6/2002 | |
| JP | 2002241910 | | 8/2002 | |
| JP | 2002256364 | | 9/2002 | |
| JP | 3333600 | | 10/2002 | |
| JP | 3505825 | | 3/2004 | |
| JP | 2004084060 | | 3/2004 | |
| JP | 2006225719 | | 8/2006 | |
| JP | 2006225723 | | 8/2006 | |
| JP | 2008038166 | | 2/2008 | |
| JP | 2008308760 | | 12/2008 | |
| JP | 2010185646 | | 8/2010 | |
| JP | 2010255120 | | 11/2010 | |
| JP | 2011042853 | | 3/2011 | |
| JP | 2012026008 | | 2/2012 | |
| JP | 2012126950 | | 7/2012 | |
| JP | 2013040367 | | 2/2013 | |
| JP | 2013040367 A | * | 2/2013 | ............ C22C 21/00 |
| KR | 100693673 | | 3/2007 | |
| KR | 20090114593 | | 11/2009 | |
| KR | 20160042055 | | 4/2016 | |
| KR | 20160042056 | | 4/2016 | |
| TR | 201717344 | | 10/2017 | |
| WO | 0005426 | | 2/2000 | |
| WO | 0136697 | | 5/2001 | |
| WO | 0153552 | | 7/2001 | |
| WO | 0153553 | | 7/2001 | |
| WO | 2004094679 | | 11/2004 | |
| WO | 2007013380 | | 2/2007 | |
| WO | 2012143183 | | 10/2012 | |
| WO | 2013024732 | | 2/2013 | |
| WO | 2013111884 | | 8/2013 | |
| WO | 2016022457 | | 2/2016 | |

OTHER PUBLICATIONS

U.S. Appl. No. 14/816,280, Final Office Action, dated Nov. 1, 2019, 13 pages.
U.S. Appl. No. 14/816,280, Final Office Action, dated May 29, 2018, 7 pages.
U.S. Appl. No. 14/816,280, Final Office Action, dated Dec. 27, 2021, 8 pages.
U.S. Appl. No. 14/816,280, Non-Final Office Action, dated Mar. 30, 2020, 10 pages.
U.S. Appl. No. 14/816,280, Non-Final Office Action, dated Jan. 18, 2018, 7 pages.
U.S. Appl. No. 14/816,280, Non-Final Office Action, dated Apr. 18, 2019, 9 pages.
U.S. Appl. No. 14/816,280, Non-Final Office Action, dated Jun. 14, 2021, 9 pages.
U.S. Appl. No. 14/816,280, Restriction Requirement, dated Oct. 6, 2017, 7 pages.
Aleris Rolled & Extruded Product, "Aluminium heat exchanger materials, Availability of heat exchanger materials—Clad alloys", Internet Citation, URL:http://www.aleris.com/sitesjdefault/files/Aluminium%20heat%20exchanger%20materia Is issue%202007 5.pdf, May 9, 2007, 20 pages.
Chinese Application No. 201580042137.6, Notice of Decision to Grant, dated Mar. 20, 2019, 6 pages.
Chinese Application No. 201580042137.6, Office Action, dated Jun. 6, 2018, 21 pages.
Chinese Application No. 201580042137.6, Office Action, dated Oct. 10, 2017, 23 pages.
Chinese Application No. 201580042137.6, Office Action, dated Dec. 12, 2018, 8 pages.
Davis, "Aluminum and Aluminum Alloys", ASM Specialty Handbook, 1993, pp. 1-3.
European Application No. 15747959.3, Notice of Decision to Grant, dated Sep. 3, 2020, 3 pages.
European Application No. 15747959.3, Office Action, dated Jul. 24, 2018, 5 pages.
Japan Aluminum Association Corp, "Metal Material Series Utilizing On-site Aluminum", Kogyo Chosakai Publishing Co., Ltd., Japan, Nov. 9, 2007, pp. 185-194.
Japanese Application No. 2017-526487, Notice of Decision to Grant, dated Aug. 4, 2020, 2 pages.
Japanese Application No. 2017-526487, Office Action, dated Jan. 29, 2019, 4 pages.
Japanese Application No. 2017-526487, Office Action, dated Jan. 23, 2018, 9 pages.
Japanese Application No. 2019-096330, Office Action, dated Jun. 30, 2020, 10 pages.
Korean Application No. 10-2017-7005988, Notice of Decision to Grant, dated Jan. 7, 2019, 1 page.
Korean Application No. 10-2017-7005988, Office Action, dated May 19, 2018, 10 pages.
Korean Application No. 10-2017-7005988, Office Action, dated Nov. 12, 2018, 5 pages.
Korean Application No. 10-2017-7005988, International Search Report & Written Opinion, dated May 22, 2013, 8 pages.
Korean Application No. 10-2017-7005988, International Preliminary Report on Patentability, dated Feb. 16, 2017, 9 pages.
Internatioanl Application No. PCT/US2015/043380, International Search Report and Written Opinion, dated Oct. 19, 2015, 13 pages.

(56) References Cited

OTHER PUBLICATIONS

Yoshino et al., "Effect of Additional Si and Cu on Strength and Corrosion Resistance of Sacrificial Anode Fin Stock for Automotive Heat Exchangers", Journal of Japan Institute of Light Metals, vol. 59, No. 5, May 30, 2009, pp. 229-235.

\* cited by examiner

ALUMINUM ALLOY FOR HEAT EXCHANGER FINS

PRIOR RELATED APPLICATIONS

This application is a divisional of U.S. patent application Ser. No. 14/816,280 filed Aug. 3, 2015, which claims the benefit of U.S. Provisional Application No. 62/033,879 filed Aug. 6, 2014. The above-listed applications are hereby incorporated herein by reference in their entireties.

FIELD OF THE INVENTION

The present invention relates to the fields of material science, material chemistry, metallurgy, aluminum alloys, aluminum fabrication, and related fields. The present invention provides novel aluminum alloys for use in the production of heat exchanger fins, which are, in turn, employed in various heat exchanger devices, for example, motor vehicle radiators, condensers, evaporators and related devices.

BACKGROUND

The automotive heat exchanger industry presents a number of demands on the aluminum materials used for production of heat exchanger fins ("fin stock materials"). These demands may be difficult to balance. When heat exchanger devices are produced, their parts are typically joined by brazing, which requires aluminum fin stock materials to have good brazing performance, strong pre-braze mechanical properties and high post-braze. In order to make heat exchangers lighter, for example, to improve automobile fuel efficiency, it is desirable for aluminum fin stock material to be thinner. At the same time, heat exchanger fins also must conduct significant quantities of heat. Thinner fin stock aluminum alloys may have reduced strength and performance during brazing. Furthermore, aluminum fin stock material requires an appropriate corrosion potential for good corrosion performance of the heat exchanger. For example, it may be desirable for the heat exchanger fins to have lower corrosion potential than the remainder of the heat exchanger, so that the fins act sacrificially. Desirable aluminum fin stock material would possess the properties and parameters that balance the above requirements. Accordingly, it is desirable to produce aluminum fin stock material that would have a required combination of thickness (gauge), would be able to withstand brazing and would exhibit appropriate mechanical characteristics before, during and after brazing, strength and conductivity characteristics suitable for high performance heat exchanger applications and suitable corrosion potential. In addition, it is desirable to produce aluminum fin stock material from an input metal that incorporates scrap aluminum in order to produce fin stock material in an environmentally friendly and cost-effective manner.

SUMMARY

The terms "invention," "the invention," "this invention" and "the present invention," as used in this document, are intended to refer broadly to all of the subject matter of this patent application and the claims below. Statements containing these terms should be understood not to limit the subject matter described herein or to limit the meaning or scope of the patent claims below. Covered embodiments of the invention are defined by the claims, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification, any or all drawings and each claim.

The present invention provides improved aluminum alloy fin stock material that possesses a combination of characteristics and properties that make it suitable for production of heat exchanger fins, to be used, for example, in heat exchangers, such as those employed in the automotive industry. In one example, the improved aluminum alloy fin stock material according to the embodiments of the present invention can be produced in a sheet form at desired thickness (gauge) that is suitable for production of lightweight heat exchange fins for automotive radiators. The aluminum alloy fin stock material according to the embodiments of the present invention can be brazed and exhibits strength characteristics before, during and after brazing that make it attractive for automotive heat exchanger applications. More specifically, improved aluminum alloy fin stock material according to the embodiments of the present invention possesses pre-braze strength characteristics that reduce fin crush problems during brazing. The aluminum alloy fin stock material according to the embodiments of the present invention also possesses sufficiently high thermal conductivity suitable for heat exchanger applications, and has a corrosion potential that is sufficiently negative for the fins to act in a sacrificial manner during corrosion of the heat exchanger. In summary, the improved aluminum alloy fin stock material according to the embodiments of the present invention possesses a combination of suitable pre- and post-braze strength, thermal conductivity, and anodic corrosion potential values suitable for automotive fin exchanger applications. At the same time, the aluminum alloy fin stock material according to the embodiments of the present invention can be produced from input aluminum that is at least in part recycle-friendly. More specifically, the improved aluminum alloy fin stock material according to the embodiments of the present invention contains levels of non-aluminum constituents, for example, Cu, Fe, Mn and Zn, that are compatible with the levels of these elements found in certain scrap aluminum as input metal.

The improved aluminum alloy fin stock material according to the embodiments of the present invention is produced in sheet form. To produce the material, the present invention provides processes for producing improved aluminum alloy fin stock material, which incorporate one or more of casting, rolling, or annealing steps. It is to be understood that, in some embodiments, the process steps employed during production of the improved aluminum alloy fin stock material confer beneficial properties and characteristics on the material. Therefore, the processes for producing the aluminum alloy fin stock material may be employed, in some cases, to describe and define the material itself. Accordingly, embodiments of the invention described using process steps are included within the scope of the present invention. For example, in some embodiments, the improved aluminum alloy fin stock material of the invention is produced in cold-worked form, which results in strain hardening and improved tensile strength characteristics of the resulting material. In one embodiment, the aluminum alloy fin stock material of the invention may be produced by a process that involves direct chill casting and cold work (cold rolling) to produce desirable pre-braze temper, for example, H14 temper. In some other embodiments, the improved fin stock aluminum alloy material can be produced in various other strain-hardened pre-braze tempers, such as H16, H18 or other H1X tempers. The process for producing the aluminum alloy fin stock material may also involve hot rolling after direct chill casting, and inter-annealing prior to final cold rolling steps (for example, between intermediate and final cold rolling steps).

The aluminum alloy fin stock material according to the embodiments of the present invention can be used in various applications, for example, for manufacturing fins for heat exchangers. In one example, the improved aluminum alloy fin stock material of the present invention is useful for high performance, light weight automotive heat exchangers. More generally, the aluminum alloy fin stock material according to the embodiments of the present invention can be used in motor vehicle heat exchangers such as radiators, condensers and evaporators. As discussed above, the compositions and the processes for producing the improved aluminum alloy fin stock material of the present invention lead to a material possessing a combination of beneficial characteristics and properties that make it suitable for manufacturing heat exchanger fins. For example, the aluminum alloy fin stock material of the present invention displays beneficial combination of one or more of the following characteristics: pre- and post-braze mechanical properties, such as tensile strength and post-braze sag resistance, heat conductivity and corrosion potential. However, the uses and applications of the improved aluminum alloy fin stock material of the present invention are not limited to automotive heat exchangers and other uses are envisioned. It is to be understood that the characteristics and properties of the aluminum alloy fin stock material of the present invention can also be beneficial for uses and applications other than the production of automotive heat exchanger fins. For example, the improved aluminum alloy fin stock material of the present invention can be used for manufacture of various devices employing heat exchangers and produced by brazing, such as devices employed in heating, ventilation, and air conditioning (HVAC).

The present invention includes aluminum alloys. One exemplary embodiment of the present invention is an aluminum alloy comprising about 0.9-1.2 wt. % Si, 0.3-0.5 wt. % Fe, 0.20-0.40 wt. % Cu, 1.0-1.5 wt. % Mn, 0-0.1 wt. % Mg and 0.0-3.0 wt. % Zn, with remainder Al and impurities at ≤0.15 wt. %. One more exemplary embodiment of the present invention is an aluminum alloy comprising about 0.9-1.2 wt. % Si, 0.3-0.5 wt. % Fe, 0.20-0.40 wt. % Cu, 1.0-1.5 wt. % Mn, 0-0.1 wt. % Mg and 0.2-3.0 wt. % Zn, with remainder Al and impurities at ≤0.15 wt. %. Another exemplary embodiment is an aluminum alloy comprising about 1.0-1.15 wt. % Si, 0.3-0.5 wt. % Fe, 0.20-0.40 wt. % Cu, 1.0-1.5 wt. % Mn, 0-0.1 wt. % Mg and 0.0-3.0 wt. % Zn, with remainder Al and impurities at ≤0.15 wt. %. Some other examples of the aluminum alloys of the present invention are as follows: an aluminum alloy comprising about 0.9-1.2 wt. % Si, 0.3-0.38 wt. % Fe, 0.20-0.40 wt. % Cu, 1.0-1.5 wt. % Mn, 0-0.1 wt. % Mg and 0.0-3.0 wt. % Zn, with remainder Al and impurities at ≤0.15 wt. %; an aluminum alloy comprising about 0.9-1.2 wt. % Si, 0.3-0.5 wt. % Fe, 0.35-0.4 wt. % Cu, 1.0-1.5 wt. % Mn, 0-0.1 wt. % Mg and 0.0-3.0 wt. % Zn, with remainder Al and impurities at ≤0.15 wt. %; an aluminum alloy comprising about 0.9-1.2 wt. % Si, 0.3-0.5 wt. % Fe, 0.20-0.40 wt. % Cu, 1.2-1.4 wt. % Mn, 0-0.1 wt. % Mg and 0.0-3.0 wt. % Zn, with remainder Al and impurities at ≤0.15 wt. %; an aluminum alloy comprising about 0.9-1.2 wt. % Si, 0.3-0.5 wt. % Fe, 0.20-0.40 wt. % Cu, 1.0-1.5 wt. % Mn, 0-0.1 wt. % Mg and 1.5-2.5% Zn, with remainder Al and impurities at ≤0.15 wt. %; an aluminum alloy comprising about 1.0-1.15 wt. % Si, 0.3-0.38 wt. % Fe, 0.35-0.40 wt. % Cu, 1.2-1.4 wt. % Mn, 0-0.1 wt. % Mg and 1.5-2.5 wt. % Zn, with remainder Al and impurities at ≤0.15 wt. %, and an aluminum alloy comprising about 1.0-1.1 wt. % Si, 0.37-0.42 wt. % Fe, 0.27-0.33 wt. % Cu, 1.3-1.35 wt. % Mn, 0.04-0.05 wt. % Mg and 1.5-1.6 wt. % Zn, with remainder Al and impurities at ≤0.15 wt. %. In the aluminum alloys of the present invention, one or more of Zr, V, Cr or Ni can be present at 0 wt. %, below 0.05 wt. %, below 0.04 wt. %, below 0.03 wt. %, below 0.02 wt. %, or below 0.01 wt. %.

In some embodiments of the present invention, the aluminum alloy has ultimate tensile strength of one or both of: at least 200 MPa, measured in pre-brazed condition, or at least 150 MPa, measured post-brazing. In one example, the aluminum alloy has ultimate tensile strength of one or both of: 200-220 MPa, measured in pre-brazed condition, or 150-160 MPa, measured post-brazing. In another example, the aluminum alloy has ultimate tensile strength of one or both of: about 210 MPa, measured in pre-brazed condition, or about 150 MPa, measured post-brazing. The aluminum alloy of the present invention can have corrosion potential of −740 mV or less, measured post-brazing. For example, the aluminum alloy can have corrosion potential of about −750 mV, measured post-brazing. The aluminum alloy can have conductivity of 43-47 IACS (International Annealed Copper Standard, which assumes pure copper conductivity for 100%), measured post-brazing.

The aluminum alloy according to the embodiments of the present invention can be produced by a process comprising: direct chill casting the aluminum alloy into an ingot; hot rolling the ingot after the direct chill casting; after the hot rolling, cold rolling the aluminum alloy to an intermediate thickness; after cold rolling, inter-annealing the aluminum alloy rolled to the intermediate thickness at a temperature between 200 and 400° C. (200-400° C.); and, after inter-annealing, cold rolling the aluminum alloy to achieve % cold work (% CW) of 20 to 40%, resulting in a sheet having a thickness of 70-100 μm, 70-90 μm, 75-85 μm, or 77-83 μm. % CW achieved in the above-described process can be 30 to 40%. The inter-annealing can be performed at a temperature between 320 and 370° C. (320-370° C.), between 290 and 360° C. (290-360° C.) or between 340 and 360° C. (340-360° C.). The inter-annealing time can be 30 to 60 minutes. Embodiments of the present invention include the above processes of making aluminum alloys of the present invention.

Embodiments of the present invention include objects and apparatuses, for example, a heat exchanger, comprising the aluminum alloy of the present invention. The heat exchanger can be a motor vehicle heat exchanger. The heat exchanger can be a radiator, a condenser or an evaporator. Embodiments of the present invention also include processes for making objects and apparatuses comprising alloys of the present invention. One example of such a process is a process of making a heat exchanger, comprising joining by brazing at least one first aluminum alloy form fabricated from the aluminum alloy of the present invention with a second aluminum alloy form, comprising: assembling and securing the two or more aluminum forms together; heating the two or more aluminum forms to a brazing temperature until joints are created among the two or more aluminum forms by capillary action. Uses of the aluminum alloys of the present invention for fabrication of heat exchanger fins and other objects and apparatuses are also included within the scope of the present invention. Other objects and advantages of the invention will be apparent from the following detailed description of embodiments of the invention.

DETAILED DESCRIPTION

Among other things, this document describes innovative aluminum alloy materials. These innovative aluminum materials can be referred to as "aluminum alloys," in singular or plural. The innovative aluminum materials described herein can be fabricated as sheets by processes that involve hot and/or cold rolling steps to achieve desirable thickness. Therefore, aluminum alloy materials of the present invention can be referred to as "sheet aluminum alloys," "aluminum alloy sheets," "sheets," "strips," or by other related terms, in singular or plural. The innovative aluminum alloy materials according to the embodiments of the present application are suitable for production of fins for heat exchanger apparatuses and therefore can be termed "fin stock," "fin stock aluminum alloy," "aluminum alloy for fin production," "aluminum alloy for heat exchanger fins," "aluminum alloy fin stock material," "aluminum alloy fin stock," "fin stock alloy" and other related terms.

The properties of aluminum alloy fin stock materials vary based on their composition. The aluminum alloy fin stock material according to the embodiments of the present invention possesses a number of advantageous properties. The aluminum alloy fin stock material of the present invention is produced in the form of sheets and possesses a combination of thickness (gauge) and strength before, during and after brazing that make it suitable for manufacturing of fins for heat exchanger applications. The aluminum alloy material according to the embodiments of the present invention also possesses thermal conductivity and corrosion potential suitable for fin stock production.

The aluminum alloy fin stock material according to the embodiments of the present invention can contain higher content of one or more of Cu, Si and Fe, in comparison to known fin stock alloys. The composition of the aluminum alloy fin stock material of the present invention and/or its production process lead to improved properties of the material, such as reduction of fin crush during brazing, higher post-braze strength, improved thermal conductivity, improved sag resistance and increased anodic corrosion potential. The aluminum alloy fin stock material according to the embodiments of the present invention possesses one or more of strength, heat conductivity and corrosion potential that is improved in comparison with known alloys used for fin stock production. The relatively high levels of non-aluminum constituents in the aluminum alloy fin stock material according to the embodiments of the present invention allow it to be produced from input metal that incorporates recycle-friendly aluminum, allowing for different metal inputs.

In some embodiments of the present invention, the aluminum alloy fin stock material is produced by a process comprising a heat treatment (inter-annealing) step before a final cold rolling step. Inter-annealing is conducted at a temperature between 200 and 400° C. for a period from about 30 min to 2 hours (in some embodiments, for a time period of about 1 to 2 hours). Inter-annealing is followed by cold rolling steps leading to specified reduction of thickness ("% cold work", defined later in this document). In some embodiments of the present invention, the above combination of process steps (inter-annealing followed by cold rolling) results in increase of pre-braze strength and improved coarse post-braze grain structure, which leads to improved sag resistance of the improved aluminum fin stock materials according to the embodiments of the present invention, and also affects heat conductivity and corrosion potential, thus leading to a material having a favorable combination of characteristics and properties.

Compositions

TABLE 1a

Alloy constituents (wt. %)*

| Element | Examples of lower range limit | Examples of upper range limit |
|---|---|---|
| Si | 0.9, 1.0, 1.1, 1.15, 1.2, 1.25, 1.3, 1.35, 1.4, 1.45 | 1.0, 1.1, 1.15, 1.2, 1.25, 1.3, 1.35, 1.4, 1.45, 1.5 |
| Fe | 0.25, 0.3, 0.35, 0.37, 0.38, 0.4, 0.42, 0.45 | 0.3, 0.35, 0.37, 0.38, 0.4, 0.42, 0.45, 0.5 |
| Cu | 0.2, 0.25, 0.27, 0.3, 0.33, 0.35, 0.4 | 0.25, 0.27, 0.3, 0.33, 0.35, 0.4, 0.45 |
| Mn | 1.0, 1.1, 1.2, 1.3, 1.35, 1.4 | 1.1, 1.2, 1.3, 1.35, 1.4, 1.5 |
| Zn | 0.0, 0.2, >0.2, 0.21, 0.22, 0.25 1.0, 1.5, 1.6, 1.7, 2.0, 2.5, 3.0 | 1.0, 1.5, 1.6, 1.7, 2.0, 2.5, 3.0, 3.5 |
| Mg | 0, 0.01, 0.02, 0.03, 0.04, 0.05, 0.06, 0.07, 0.08, 0.09, 0.1 | 0.01, 0.02, 0.03, 0.04, 0.05, 0.06, 0.07, 0.08, 0.09, 0.1 |

TABLE 1b

Alloy composition examples*

| | Si (wt. %) | Fe (wt. %) | Cu (wt. %) | Mn (wt %) | Zn (wt. %) | Mg (wt. %) |
|---|---|---|---|---|---|---|
| Range 1 | 0.9-1.2 | 0.3-0.5 | 0.20-0.40 | 1.0-1.5 | 0.0-3.0 | 0.0-0.1 |
| Range 2 | 0.9-1.2 | 0.3-0.5 | 0.20-0.40 | 1.0-1.5 | 0.2-3.0 | 0.0-0.1 |
| Range 3 | 0.9-1.2 | 0.3-0.5 | 0.25-0.35 | 1.2-1.4 | 1.5-1.7 | 0.0-0.05 |
| Range 4 | 1.0-1.15 | 0.25-0.38 | 0.25-0.35 | 1.1-1.4 | 0.0-3.0 | 0.0-0.1 |
| Range 5 | 1.0-1.15 | 0.25-0.38 | 0.25-0.35 | 1.1-1.4 | 1.0-3.0 | 0.0-0.1 |
| Range 6 | 1.0-1.15 | 0.30-0.38 | 0.25-0.35 | 1.2-1.4 | 1.5-2.5 | 0.0-0.1 |
| Range 7 | 1.0-1.15 | 0.30-0.38 | 0.35-0.40 | 1.2-1.4 | 1.5-2.5 | 0.0-0.1 |
| Range 8 | 0.9-1.2 | 0.3-0.5 | 0.35-0.40 | 1.0-1.5 | 0.0-3.0 | 0.0-0.1 |
| Range 9 | 1.0-1.1 | 0.37-0.42 | 0.27-0.33 | 1.3-1.35 | 1.5-1.6 | 0.04-0.05 |

*Remainder of the alloy is aluminum and the total of impurities at ≤0.15 wt. %

The composition of the aluminum alloys according to the embodiments of the present invention is illustrated in Tables 1a and 1b. The content of Si, Cu, Fe, Mn and Zn can fall within the ranges delimited by a lower range limit and an upper range limit selected from the limits shown in Table 1a. A lower range limit can be delineated by expressions "equal to or more than" (≥sign) or "more than" (> sign), or other related signs and expression, such as "from . . . ," "higher than" etc. An upper range limit can be delineated by expressions "equal to or less than" (≤sign), "less than" (<sign) or other related signs and expressions, such as "to," "less than," etc. Other types of expressions can also be used to delineate the ranges, such as "between," "in the range of," etc. When a range is delineated by only the upper range limit, it is to be understood that, in some examples falling within such a range, an element in question may not be present, may not be present in detectable quantities, or may be present in such low quantities that they are conventionally not recognized as meaningful in the field of aluminum alloys.

It is to be understood that, in various embodiments of the alloys described herein, the predominant element is aluminum (Al), sometimes called "remainder Al." In other words, the term "remainder" can be used to describe predominant aluminum (Al) content in the aluminum alloys described herein. It is also to be understood that the alloys described herein can comprise various unavoidable impurities not otherwise specified. In some non-limiting examples, a content of each impurity can constitute up to 0.05 wt. %. In some other non-limiting examples, a total content of impurities can constitute up to 0.15 wt. %. For example, a content of each impurity can be 0 wt. %, below 0.05 wt. %, below 0.04 wt. %, below 0.03 wt. %, below 0.02 wt. %, or below 0.01 wt. %, while a total content of all impurities can constitute up to 0.15 wt. %. Some non-limiting examples of impurities are Zr, V, Cr, or Ni. The levels of various constituents of the alloys can be chosen to fall within the ranges described throughout this document using various considerations, some of which are discussed below.

Si: Among other things, Si content affects melting temperature of an aluminum alloy. Increasing the content of Si reduces the melting point of the aluminum alloy. Accordingly, in order for the aluminum alloy fin stock to be brazeable, Si content of the alloy should be sufficiently low so that the alloy does not melt during the brazing cycle. On the other hand, relatively high Si content in the alloy leads to formation of AlMnSi dispersoids resulting in beneficial dispersoid strengthening of the matrix and improved strength characteristics of the alloy. The Si content used in the fin stock alloy according to the embodiments of the present invention balances the above factors. Aluminum alloys according to embodiments of the present invention can comprise, for example, 0.9-1.0, 0.9-1.1, 0.9-1.15, 0.9-1.2, 0.9-1.25, 0.9-1.3, 0.9-1.35, 0.9-1.4, 0.9-1.45, 0.9-1.5, 1.0-1.1, 1.0-1.15, 1.0-1.2, 1.0-1.25, 1.0-1.3, 1.0-1.35, 1.0-1.4, 1.0-1.45, 1.0-1.5, 1.1-1.15, 1.1-1.2, 1.1-1.25, 1.1-1.3, 1.1-1.35, 1.1-1.4, 1.1-1.45, 1.1-1.5, 1.15-1.2, 1.15-1.25, 1.15-1.3, 1.15-1.35, 1.15-1.4, 1.15-1.45, 1.15-1.5, 1.2-1.25, 1.2-1.3, 1.2-1.35, 1.2-1.4, 1.2-1.45, 1.2-1.5, 1.25-1.3, 1.25-1.35, 1.25-1.4, 1.25-1.45, 1.25-1.5, 1.3-1.35, 1.3-1.4, 1.3-1.45, 1.3-1.5, 1.35-1.4, 1.35-1.45, 1.35-1.5, 1.4-1.45, 1.4-1.5 or 1.45-1.5 wt. % Si.

Cu: Cu in solid solution increases strength of an aluminum alloy. Increasing Cu content may also lead to formation of Cu containing AlMnCu dispersoids, which stores Mn and dissolves during brazing, thus leading to release of Mn into solid solution. This process results in improved post-braze strength. Relatively high Cu content of the fin stock alloys according to the embodiments of the present invention allows for cost reduction and increase in recycling capacity. Aluminum alloys according to the embodiments of the present invention can comprise, for example, 0.2-0.25, 0.2-0.27, 0.2-0.3, 0.2-0.35, 0.2-0.4, 0.2-0.45, 0.25-0.27, 0.25-0.3, 0.25-0.33, 0.25-0.35, 0.25-0.4, 0.25-0.45, 0.27-0.3, 0.27-0.33, 0.27-0.35, 0.27-0.4, 0.27-0.45, 0.3-0.33, 0.3-0.35, 0.3-0.4, 0.3-0.45, 0.33-0.35, 0.33-0.4, 0.33-0.45, 0.35-0.4, 0.35-0.45 or 0.4-0.45 wt. % Cu.

Zn: Zn is typically added to aluminum alloys to move the corrosion potential towards the anodic end of the scale. In the fin stock aluminum alloy according to the embodiments of the present invention, relatively high Zn content of up to 3 wt. % compensates for the shift in corrosion potential due to increased Si and Cu content, thus resulting in more anodic corrosion potential, allowing the fins manufactured from the alloy to act sacrificially and protect heat exchanger tubes, thus improving in overall corrosion resistance of the heat exchanger. Aluminum alloys according to the embodiments of the present invention can comprise, for example, 0.0-1.0, 0.0-1.5, 0.0-1.6, 0.0-1.7, 0.0-2.0, 0.0-2.5, 0.0-3.0, 0.0-3.5, 0.2-1.0, 0.2-1.5, 0.2-1.6, 0.2-1.7, 0.2-2.0, 0.2-2.5, 0.2-3.0, 0.2-3.5, 0.21-1.0, 0.21-1.5, 0.21-1.6, 0.21-1.7, 0.21-2.0, 0.21-2.5, 0.21-3.0, 0.21-3.5, 1.0-1.5, 1.0-1.6, 1.0-1.7, 1.0-2.0, 1.0-2.5, 1.0-3.0, 1.0-3.5, 1.5-1.6, 1.5-1.7, 1.5-2.0, 1.5-2.5, 1.5-3.0, 1.5-3.5, 1.6-1.7, 1.6-2.0, 1.6-2.5, 1.6-3.0, 1.6-3.5, 1.7-2.0, 1.7-2.5, 1.7-3.0, 1.7-3.5, 2.0-2.5, 2.0-3.0, 2.0-3.5, 2.5-3.0, 2.5-3.5 or 3.0-3.5 wt. % Zn.

Mn: Mn in solid solution increases strength of an aluminum alloy but also moves corrosion potential towards a more cathodic state. (FeMn)—$Al_6$ or $Al_{15}Mn_3Si_2$ dispersoid increases strength of an aluminum alloy by particle strengthening, when present in a fine and dense dispersion. Depending on the composition and solidification rate, Fe, Mn, Al and Si combine during solidification to form various intermetallic constituents, i.e. particles within the microstructure, like $Al_{15}(Fe\ Mn)_3Si_2$ or $Al_5FeSi$ or $Al_8FeMg_3Si_6$, to name a few. Higher Mn content, particularly in combination with higher Fe content, may lead to formation of coarse Mn—Fe intermetallic constituents. Aluminum alloys according to the embodiments of the present invention can comprise, for example, 1.0-1.1, 1.0-1.2, 1.0-1.3, 1.0-1.35, 1.0-1.4, 1.0-1.5, 1.0-1.1, 1.1-1.2, 1.1-1.3, 1.1-1.35, 1.1-1.4, 1.1-1.5, 1.2-1.3, 1.2-1.35, 1.2-1.4, 1.2-1.5, 1.3-1.35, 1.3-1.4, 1.3-1.5, 1.35-1.4, 1.35-1.5 or 1.4-1.5 wt. % Mn.

Fe: In an aluminum alloy, Fe can be a part of intermetallic constituents which may contain Mn, Si, and other elements. It is often beneficial to control Fe content in an aluminum alloy to influence the content of coarse intermetallic constituents. Aluminum alloys according to the embodiments of the present invention can comprise, for example, 0.25-0.3, 0.25-0.35, 0.25-0.37, 0.25-0.38, 0.25-0.4, 0.25-0.42, 0.25-0.45, 0.25-0.5, 0.3-0.35, 0.3-0.37, 0.3-0.38, 0.3-0.4, 0.3-0.42, 0.3-0.45, 0.3-0.5, 0.35-0.37, 0.35-0.38, 0.35-0.4, 0.35-0.42, 0.35-0.45, 0.35-0.5, 0.37-0.38, 0.37-0.4, 0.37-0.42, 0.37-0.45, 0.37-0.50, 0.38-0.4, 0.38-0.42, 0.38-0.45, 0.38-0.5, 0.4-0.42, 0.4-0.45, 0.4-0.5 or 0.45-0.5 wt. % Fe.

Mg contributes to strength of aluminum through solid solution strengthening. Aluminum alloys according to the embodiments of the present invention can comprise, for example, 0-0.01, 0-0.02, 0-0.03, 0-0.04, 0-0.05, 0-0.06, 0-0.07, 0-0.08, 0-0.09, 0-0.1, 0.01-0.02, 0.01-0.03, 0.01-0.04, 0.01-0.05, 0.01-0.06, 0.01-0.07, 0.01-0.08, 0.01-0.09, 0.01-0.1, 0.02-0.03, 0.02-0.04, 0.02-0.05, 0.02-0.06, 0.02-0.07, 0.02-0.08, 0.02-0.09, 0.02-0.1, 0.03-0.04, 0.03-0.05, 0.03-0.06, 0.03-0.07, 0.03-0.08, 0.03-0.09, 0.03-0.1, 0.04-0.05, 0.04-0.06, 0.04-0.07, 0.04-0.08, 0.04-0.09, 0.04-0.1, 0.05-0.06, 0.05-0.07, 0.05-0.08, 0.05-0.09, 0.05-0.1, 0.06-0.07, 0.06-0.08, 0.06-0.09, 0.06-0.1, 0.07-0.08, 0.07-0.09, 0.07-0.1, 0.08-0.09, 0.08-0.1, 0.09-0.1 wt % Mg.

In the aluminum alloys according to the embodiments of the present invention, there is no intentionally added Zr, V, Cr, or Ni, expect for the impurities found in scrap input aluminum. In the aluminum alloy according to the embodiments of the present invention, such impurities may be 0%, below 0.05%, below 0.04%, below 0.03%, below 0.02%, or below 0.01% provided the sum of all impurities is not more than 0.15%. Some exemplary embodiments of the fin stock aluminum alloy compositions are described in the "Summary" section of this document.

Processes for Making Aluminum Alloy Fin Stock Material

The processes for making or fabricating aluminum alloy fin stock material described herein, as well as for fabricating the objects using aluminum alloy fin stock material of the present invention, are also included within the scope of the present invention. Aluminum alloy fin stock material described herein can be fabricated by the processes that include at least some of the technological steps described in this document. It is to be understood that, unless specifically set forth as such, descriptions of the processes contained in this document are non-limiting with respect to the claimed embodiments of the present invention. The process steps described herein can be combined and modified in various ways and suitably employed for fabricating aluminum alloys or forms and objects from such alloys. Process steps and conditions that are not explicitly described herein, yet commonly employed in the areas of metallurgy and aluminum processing and fabrication, can also be incorporated into the processes falling within the scope of the present invention. Aluminum alloy fin stock materials according to the embodiments of the present invention can employ the process steps and the conditions discussed below.

A process for producing aluminum alloy fin stock materials can employ direct chill (DC) casting an aluminum alloy into an ingot. Following DC casting, the process comprises hot rolling of the ingot. The ingots produced by DC casting are preheated for hot rolling. The preheating temperature and duration of hot rolling are finely controlled to preserve a large grain size and high strength after the finished fin stock is brazed. In the processes according to the embodiments of the present invention, for hot rolling, the ingots can be preheated to up to 500° C., for example, to 450-480° C., in a furnace for up to 12 hours at a suitable heating rate, for example 50° C./hr, followed by maintaining the temperature ("soak" or "soaking") at 450-500° C., for example, at 470-480° C., for 5-7 hours. Following preheating and soaking, the ingots are hot rolled to 2-10 mm (for example, 3-5 mm or 3.5-4 mm) thickness, which may be referred to as "exit gauge" after hot rolling.

A process for producing aluminum alloy fin stock materials comprises cold rolling steps to produce desired thickness (gauge) and other properties of the material. For example, following a hot rolling step, the hot rolled aluminum alloy is cold-rolled to 1-2 mm, for example, to 1 mm, thickness or gauge (initial cold rolling gauge) during an initial cold rolling step, which can comprise multiple cold rolling passes, followed by further cold rolling to 100-200 µm thickness or gauge (intermediate cold rolling gauge) during an intermediate cold rolling step, which can also comprise multiple passes. Depending on the hot rolling gauge, desirable final thickness, and other properties discussed below, an aluminum alloy may require more or fewer cold rolling passes to achieve the desired gauge. This number of cold rolling passes is not limited and can be suitably adjusted, for example, depending on the desirable thickness of the final sheet and other properties of the material.

Following intermediate cold rolling, the process for producing aluminum alloy fin stock materials comprises an inter-annealing step to produce desired properties of the aluminum alloy fin stock material according to the embodiments of the present invention. The term "inter-annealing" refers to a heat treatment applied between cold rolling steps. In the context of the present invention, inter-annealing is applied between the intermediate and final cold rolling steps. Inter-annealing involves heating the aluminum alloy to a temperature of about from about 200 to about 400° C., for example, from about 300 to about 375° C., from about 325 to about 350° C., from about 340 to about 360° C., from about 290 to about 360° C. or from about 345 to about 350° C. ("inter-annealing temperature"), and maintaining the inter-annealing temperature for 3-5 hours, for example, for about 4 hours, followed by cooling. The period of maintaining a temperature of about 200 to about 400° C. can also be referred to as "soak" or "soaking." For heating and cooling the material before and after the soak, a constant rate of 40 to 50° C./hr, for example, 50° C./hr, is applied. Inter-annealing conditions affect the structure and the properties of the aluminum alloy fin stock material in various ways. For example, higher inter-annealing temperatures can lead to lower post-braze strength. Accordingly, the inter-annealing conditions are selected within the ranges specified in this document to result in the desirable properties of the aluminum alloy fin stock material.

Following inter-annealing, final cold rolling is performed to achieve % cold work (% CW) during the final cold rolling step (which can comprise multiple cold rolling passes) of 20 to 45%, 25 to 40%, 20 to 40%, 20 to 35%, 25 to 35%, wherein $$\% \ CW = \frac{\text{thickness before cold rolling} - \text{thickness after cold rolling}}{\text{thickness before cold rolling}} * 100\%.$$

After the final cold rolling steps, the aluminum alloy fin stock material of the present invention possesses a thickness (gauge) of about 70-100 µm, 70-90 µm, 75-85 µm, or 77-83 µm.

The final cold rolling step affects the structure and properties of the aluminum alloy fin stock material. For example, as % CW increases, pre-braze strength (ultimate tensile strength (UTS), yield strength (YS), or both, measured in pre-brazed condition) of the aluminum material increases. Accordingly, the % CW employed is adjusted within the ranges specified in this document to achieve desirable properties of the aluminum alloy fin stock material.

The processes of producing aluminum alloy fin stock materials of the present invention lead to an aluminum material that can be described as "strain-hardened," "cold-worked," and/or having or being in "H1X" temper (for example, H14 temper). In some examples, improved fin stock aluminum alloy material according to the embodiments in the present invention can be produced in H14, H16 or H18 tempers. It is to be understood that a particular range of properties is associated with the temper designation. It is also to be understood that the temper designation refers to the pre-braze properties of the material.

Properties

The aluminum alloy fin stock material according to the embodiments of the present invention possesses a number of advantageous properties, characteristics or parameters. These properties, separately or in various combinations, allow the aluminum alloy materials described in this document to be used in production of fins for heat exchangers. However, it is to be understood that the scope of the present invention is not limited to specific uses or applications, and the properties of the aluminum alloy fin stock materials can be advantageous for various other applications. Some of these properties are discussed below. Some other properties may not be specifically described, but may follow from the composition of and/or production processes employed for fabrication of the aluminum alloy fin stock material of the present invention.

Some embodiments of the aluminum alloy materials of the present invention are manufactured as sheets, for example, as sheets 77-83 µm thick. The aluminum alloy sheets can be produced in H1X temper (for example, H14 H16 or H18 temper). Aluminum alloy materials according to the embodiments of the present invention are manufactured can possess one or more of the following properties, in any combination: UTS of 210 MPa or more (in other words, at least 210 MPa) or 210-220 MPa, measured in pre-brazed condition; UTS of 150 MPa or more (in other words, at least 150 MPa) or 150-160 MPa, measured post-brazing; sag resistance of 25-33 mm measured post-brazing; conductivity of 42-48, 43-47, or 44-45 IACS measured post-brazing;

open circuit potential corrosion value (vs. Standard Calomel Electrode (SCE), also referred to as "corrosion potential") of −740 mV or less (for example, −750 mV); and/or coarse post-braze grain microstructure. The parameters measured "after brazing" or "post-brazing," also referred to as "post-braze," are measured after a simulated brazing cycle, during which aluminum alloy samples are heated to a temperature of 595 to 610° C. and cooled to room temperature in a period of about 20 minutes. The parameters measured before brazing ("pre-brazing" or in "pre-brazed" condition), also referred to as "pre-braze" parameters are measured before or without subjecting the material to any brazing cycle.

Some embodiments of aluminum alloy fin stock material of the present invention have improved strength and conductivity and exhibit lower corrosion potential values. The term "conductivity" and the related terms and expressions used herein to describe aluminum alloy fin stock material of the present invention may refer to thermal (heat) conductivity or electrical conductivity, depending on the context. When not explicitly defined, the term "conductivity" generally, but not always, refers to electrical conductivity. Conductivity expressed in IACS units is electrical conductivity. The above properties and advantages allow aluminum alloy fin stock material of the present invention to be advantageously employed in various uses and applications, discussed in more detail below.

Uses and Applications

The aluminum alloy fin stock materials described in this document can be used in various applications, for example, but not limited to, heat exchangers. In one embodiment, the aluminum alloy fin stock material can be used in automotive heat exchangers such as radiators, condensers and evaporators. However, the uses and applications of the improved aluminum alloy fin stock material of the present invention are not limited to automotive heat exchangers and other uses are envisioned. For example, the improved aluminum alloy fin stock material of the present invention can be used for manufacture of various devices employing heat exchangers and produced by brazing, such as devices employed in heating, ventilation, and air conditioning (HVAC). Uses and applications of the aluminum alloy fin stock materials described herein are included within the scope of the present invention, as are objects, forms, apparatuses and similar things fabricated with or comprising the aluminum alloys described herein. The processes for fabricating, producing or manufacturing such objects, forms, apparatuses and similar things are also included within the scope of the present invention.

Aluminum alloys described herein are suitable for fabrication or manufacturing processes that require the joining of metal surfaces by brazing. Brazing is a metal-joining process in which filler metal is heated above a melting point and distributed between two or more close-fitting parts by capillary action. The uses of the aluminum alloys in brazing and the related processes and results, such as the objects fabricated according to the manufacturing process that involve brazing, are generally referred to as "brazing applications." The parts of the heat exchangers according to some of the embodiments of the present invention are joined by brazing during the manufacturing process. During brazing, the filler metal melts and becomes the filler metal that is available to flow by capillary action to points of contact between the components being brazed.

One exemplary object that can be fabricated using aluminum alloy fin stock materials described herein is a heat exchanger. Heat exchangers are produced by the assembly of parts comprising tubes, plates, fins, headers, and side supports to name a few. For example, a radiator is built from tubes, fins, headers and side supports. Except for the fins, which are typically bare, meaning not clad with an Al—Si alloy, all other parts of a heat exchanger are typically clad with a brazing cladding on one or two sides. Once assembled, a heat exchanger unit is secured by banding or such device to hold the unit together through fluxing and brazing. Brazing is commonly effected by passing the unit through a tunnel furnace. Brazing can also be performed by dipping in molten salt or in a batch or semi-batch process. The unit is heated to a brazing temperature between 590° C. and 610° C., soaked at an appropriate temperature until joints are created by capillary action and then cooled below the solidus of the filler metal. Heating rate is dependent on the furnace type and the size of the heat exchanger produced. Some other examples of the objects that can be fabricated using aluminum alloy fin stock materials described herein are an evaporator, a radiator, a heater or a condenser.

The following example will serve to further illustrate the present invention without, at the same time, however, constituting any limitation thereof. On the contrary, it is to be clearly understood that resort may be had to various embodiments, modifications and equivalents thereof which, after reading the description herein, may suggest themselves to those skilled in the art without departing from the spirit of the invention.

Example 1

An aluminum alloy comprising 1.0-1.1 wt. % Si, 0.37-0.42 wt. % Fe; 1.5-1.6 wt. % Zn, 1.3-1.35 wt. % Mn, 0.27-0.33 wt. % Cu, 0.04-0.05 wt. % Mg, with the remainder being aluminum and unavoidable impurities, was DC cast into an ingot. The ingot was preheated to 480° C. in 12 hours at a heating rate of 50° C./hr, soaked at 460-480° C. for 6 hours and hot rolled to 3.5-4 mm thickness. Next the sheet was cold rolled to about 1 mm thickness and then cold rolled to about 123 µm intermediate thickness, followed by an inter-annealing treatment involving a soak at 350° C. for 4 hours, with constant heating and cooling rate of 50° C./hr applied before and after the soak, and subsequent cold rolling to a final gauge of about 80 µm, which corresponds to 35% CW. The resulting alloy material had a minimum ultimate tensile strength of about 220 MPa in pre-braze condition and about 150-160 MPa post-brazing. The alloy material had an average conductivity post-brazing of about 44-45 IACS and an open circuit potential corrosion value (vs. Standard Calomel Electrode (SCE)) of −750 mV measured per the ASTM G69 standard. The alloy material exhibited a coarse post-braze microstructure and a sag value of 21.5 mm (an average of 2 measurements using different coupons from the same sample). The above properties were measured after applying a simulated brazing cycle, during which the samples were heated to a temperature of 605° C. and cooled to room temperature in a period of about 20 minutes, to simulate the temperature time profile of a commercial brazing process.

Example 2

An aluminum alloy comprising 1.0-1.1 wt. % Si, 0.37-0.42 wt. % Fe; 1.5-1.6 wt. % Zn, 1.3-1.35 wt. % Mn, 0.27-0.33 wt. % Cu, 0.04-0.05 wt. % Mg, with the remainder being aluminum and unavoidable impurities, was DC cast into an ingot. The ingot was preheated to 480° C. in 12 hours at a heating rate of 50° C./hr, soaked at 460-480° C. for 6 hours and hot rolled to 3.5-4 mm thickness. Next the sheet was cold rolled to about 1 mm thickness and then cold rolled to an intermediate thickness, followed by inter-annealing treatment at two different temperatures. For inter-annealing, the samples of the alloy were subjected to soaks at either 350° C. or 500° C. for 4 hours, with a constant heating and cooling rate of 50° C./hr applied before and after the soak, and subsequent cold rolling to a final gauge of about 80 μm, corresponding to 40% CW. The sag resistance values and post-braze microstructure of the alloy samples were examined after applying a simulated brazing cycle described in Example 1. The alloy samples ("first group") produced with inter-annealing involving a soak at 350° C. exhibited a coarse post-braze microstructure and an average sag value of 24 mm. In comparison, the alloy samples produced with inter-annealing involving a soak at 500° C. ("second group") exhibited a finer post-braze grain structure than the first group and an average sag value of 32 mm. The alloy samples of the first group, annealed at lower temperature, exhibited higher sag resistance values.

All patents, patent applications, publications, and abstracts cited above are incorporated herein by reference in their entirety. Various embodiments of the invention have been described in fulfillment of the various objectives of the invention. It should be recognized that these embodiments are merely illustrative of the principles of the present invention. Numerous modifications and adaptations thereof will be readily apparent to those of skill in the art without departing from the spirit and scope of the invention as defined in the following claims.

We claim:

1. A process of making a fin stock aluminum alloy sheet, comprising:
   direct chill casting into an ingot an aluminum alloy comprising 0.9-1.2 wt. % Si, 0.3-0.5 wt. % Fe, 0.20-0.40 wt. % Cu, 1.25-1.5 wt. % Mn, 0-0.1 wt. % Mg, 2.0-3.0 wt. % Zn, less than 0.01 wt. % Zr, less than 0.01 wt. % Cr, and Al and impurities at ≤0.15 wt. %, wherein each impurity is below 0.05 wt. %;
   hot rolling the ingot into a hot rolled sheet;
   cold rolling the hot rolled sheet into an intermediate thickness sheet;
   inter-annealing the intermediate thickness sheet at 200-400° C.; and,
   cold rolling the intermediate thickness sheet to achieve a % cold work (% CW) of 20 to 40%, resulting in the fin stock aluminum alloy sheet having a thickness of 70-100 μm.

2. The process of claim 1, wherein no inter-annealing steps are performed prior to the inter-annealing step.

3. The process of claim 1, wherein the fin stock aluminum alloy sheet has an ultimate tensile strength of one or both of: at least 200 MPa, measured in a pre-brazed condition, or at least 150 MPa, measured post-brazing.

4. The process of claim 1, wherein the fin stock aluminum alloy sheet has a corrosion potential of −740 mV or less, measured post-brazing.

5. The process of claim 1, wherein the fin stock aluminum alloy sheet has an electrical conductivity of 43-47 IACS, measured post-brazing.

6. The process of claim 1, wherein the fin stock aluminum alloy sheet comprises 0.9-1.2 wt. % Si, 0.3-0.5 wt. % Fe, 0.20-0.40 wt. % Cu, 1.25-1.4 wt. % Mn, 0-0.1 wt. % Mg, 2.0-3.0 wt. % Zn, less than 0.01 wt. % Zr, less than 0.01 wt. % Cr, and Al and impurities at ≤0.15 wt. %, wherein each impurity is below 0.05 wt. %.

7. The process of claim 1, wherein the fin stock aluminum alloy sheet comprises 0.9-1.2 wt. % Si, 0.3-0.5 wt. % Fe, 0.20-0.40 wt. % Cu, 1.3-1.5 wt. % Mn, 0-0.1 wt. % Mg, 2.1-3.0 wt. % Zn, less than 0.01 wt. % Zr, less than 0.01 wt. % Cr, and Al and impurities at ≤0.15 wt. %, wherein each impurity is below 0.05 wt. %.

8. The process of claim 1, wherein the fin stock aluminum alloy sheet comprises 0.9-1.2 wt. % Si, 0.3-0.5 wt. % Fe, 0.20-0.40 wt. % Cu, 1.3-1.4 wt. % Mn, 0-0.1 wt. % Mg, 2.5-3.0 wt. % Zn, less than 0.01 wt. % Zr, less than 0.01 wt. % Cr, and Al and impurities at ≤0.15 wt. %, wherein each impurity is below 0.05 wt. %.

9. The process of claim 1, wherein one or more of V or Ni is present in the fin stock aluminum alloy sheet at below 0.05 wt. %.

10. A process of making a fin stock aluminum alloy sheet, comprising:
   direct chill casting into an ingot an aluminum alloy consisting of 0.9-1.2 wt. % Si, 0.3-0.5 wt. % Fe, 0.20-0.40 wt. % Cu, 1.25-1.5 wt. % Mn, 0-0.1 wt. % Mg, 2.0-3.0 wt. % Zn, and Al and impurities at ≤0.15 wt. %, wherein each impurity is below 0.05 wt. %;
   hot rolling the ingot into a hot rolled sheet;
   cold rolling the hot rolled sheet into an intermediate thickness sheet;
   inter-annealing the intermediate thickness sheet at 200-400° C.; and,
   cold rolling the intermediate thickness sheet to achieve a % cold work (% CW) of 20 to 40%, resulting in the fin stock aluminum alloy sheet having a thickness of 70-100 μm.

* * * * *